E. R. RIEDINGER.
PNEUMATIC TIRE FOR VEHICLE WHEELS.
APPLICATION FILED JULY 2, 1912.

1,041,350. Patented Oct. 15, 1912.

WITNESSES
Sidney Brooks
J. P. Davis

INVENTOR
Eugene Richard Riedinger
BY Munn & Co.
ATTORNEYS.

UNITED STATES PATENT OFFICE.

EUGENE RICHARD RIEDINGER, OF LONDON, ENGLAND, ASSIGNOR OF ONE-HALF TO ANDREW FRASER, OF LONDON, ENGLAND.

PNEUMATIC TIRE FOR VEHICLE-WHEELS.

1,041,350.  Specification of Letters Patent.  Patented Oct. 15, 1912.

Application filed July 2, 1912. Serial No. 707,318.

*To all whom it may concern:*

Be it known that I, EUGENE RICHARD RIEDINGER, a citizen of the United States of America, and resident of 84 Upper Kennington Lane, London, S. E., England, coach-builder, have invented certain new and useful Improvements in Pneumatic Tires for Vehicle-Wheels, of which the following is a specification.

This invention consists of an improved pneumatic tire-construction for vehicle wheels, constituted by a novel combination of parts comprising an inner rim permanently concentric with the axle, an intermediate or floating rim of greater diameter than said inner rim and displaceable relatively thereto, and an outer rim of greater diameter than said intermediate rim and permanently concentric therewith, the inner and outer rims having each a pair of recurved lateral flanges directed outward from the center of the wheel while the intermediate rim has a similar pair of flanges directed inward toward said center; a pair of separate elastic annular cheeks having beadings at their inner and outer edges adapted to interlock with the flanges of the inner and intermediate rims respectively so that between said rims and elastic cheeks an annular space is inclosed for the reception of the air-tube; an approximately V-shaped expansible security-band comprising an annular series of segments applied between the outer margins of the respective elastic cheeks and secured by radial bolts to the inner side of the intermediate rim; a tread-band carried by the outer rim and having lateral beadings adapted to interlock with the flanges of said rim; a pair of lateral annular clamping-plates for maintaining concentricity between the outer and intermediate rims by the exertion of a wedging action between said rims at each side and throughout the circumference of both; and bolts passing transversely through said clamping-plates and the intervening annular space and serving to draw the one clamping-plate toward the other.

Figure 1:
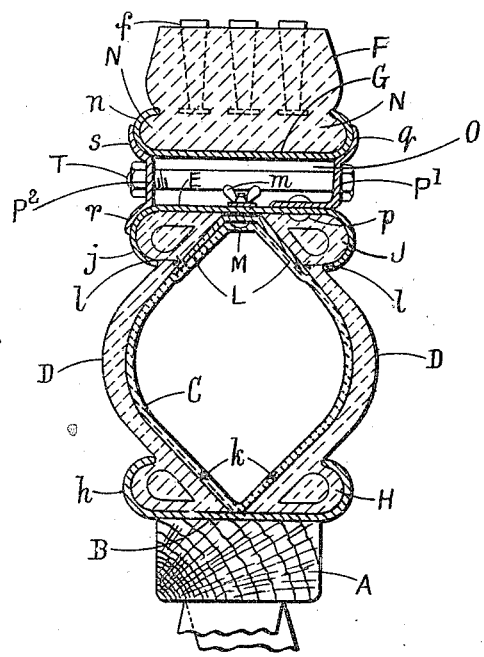
Figure 2:
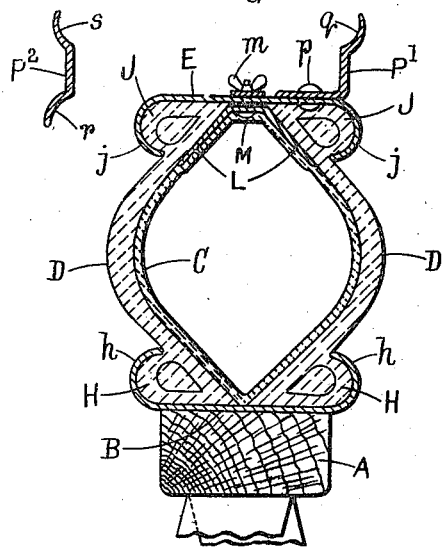

In the accompanying drawings, Figure 1 is a transverse section of the felly and tire of a wheel embodying the present invention, the various parts being shown in their normal relative positions. Fig. 2 is a similar view but with the outer rim (carrying the tread-band), and one of the annular clamping-plates, separately displaced.

A represents the wooden felly (or equivalent rigid portion of the wheel concentric with the axle); B the inner rim permanently mounted on the felly; C the air-tube; D, D, the pair of separate annular elastic cheeks serving to inclose the air-tube C laterally, attached at their inner peripheries to the inner rim B and at their outer peripheries to the floating or intermediate rim E; and F the tire-band supported concentrically with the intermediate rim E by the detachable outer rim G.

The annular cheeks D may be formed of any suitable elastic material such as rubber and canvas fabric or rubber and fiber in the well-known manner. Each cheek is provided at or near its inner and outer edges with laterally projecting annular beadings H and J adapted to interlock with inwardly recurved lateral flanges $h$ and $j$ on the inner and intermediate rims B and E respectively; the flanges $j$ on the intermediate rim E projecting therefrom toward the center so that this rim E may be constituted (in effect) by a diametrically enlarged but reversed counterpart of the inner rim B as indicated.

Those portions $k$, $k$ of the internal surfaces of the respective cheeks D, D which are comprised between the flanges $h$, $h$ of the inner rim B, converge toward one another in the direction of said rim, so that the pressure exerted by the inflated air-tube C exercises a wedging action between the surfaces $k$, $k$ sufficient to force the beadings H, H laterally apart and to hold them securely interlocked with the flanges $h$, $h$ as in the case of an ordinary pneumatic tire-cover. Similarly, those portions $l$, $l$ of the internal surfaces of the respective cheeks which are comprised between the flanges $j$, $j$ of the intermedinate rim E, converge toward one another in the direction of said rim, so that the pressure exerted by the inflated air-tube exercises a wedging-action between the surfaces $l$, $l$ sufficient to force the beadings J, J laterally apart into interlocking engagement with the flanges $j$, $j$. In order, however, to render this engagement of the beadings J, J with the flanges $j$, $j$, of the intermediate rim E more secure, an approximately V-shaped security-band L is employed to exert a positive or mechanical wedging action between the surfaces *l, l;* this band L, which is applied in segments so as to be readily expansible, being detachably secured to the intermediate rim E by means of bolts M which pass radially through holes in the band and rim as indicated. A substantially similar security-band might also (if desired) be employed between the surfaces *k, k* of the cheeks D, D, this latter security-band being, however, made contractible instead of expansible, and the bolts by which it is attached passing radially through the rim B and felly A, as will be readily understood.

The outer rim G, against which the base of the tread-band F beds itself, has a pair of inwardly recurved lateral flanges *n, n* adapted to interlock with annular beadings N, N, projecting laterally at the base of the tread-band, so that this rim G may be constituted (in effect) by a diametrically enlarged counterpart of the inner rim B. The tread-band F, which may be of any convenient type and provided with a tread or wearing-face of any desired character, is preferably formed of solid rubber or equivalent elastic material with radially extending metal studs *f* embedded in it so as to reinforce the wearing surface of the band in the well-known manner.

The outer rim G is detachably secured to the intermediate rim E by means of a pair of laterally applied annular clamping-plates which, when drawn toward one another, exert a wedging action between the respective rims at each side and throughout the circumference of both, with the result that the outer rim G, being a closed annulus, is held concentric with the intermediate rim E even if made of considerably larger diameter than the latter. Of these annular clamping-plates one, as $P^1$, may be permanently fixed to the intermediate rim E by rivets *p* as indicated, the outer margin of this plate being outwardly flared as at *q* to form a seat for the outwardly curved surface of the flange *n* at the corresponding side of the outer rim G. The other clamping-plate $P^2$, which is entirely separate from both rims, has its inner and outer margins both flared as shown at *r, s,* so as to be adapted to become wedged between the outwardly curved surfaces of the flanges *j,* and *n* at the corresponding side of the rims E and G respectively. Through holes provided in both clamping-plates $P^1$ and $P^2$ pass transverse bolts T serving to draw the plates together (or to draw the plate $P^2$ toward the plate $P^1$); these bolts extending through the closed annular space O inclosed between the two rims and the clamping plates. The annular space O also serves for the reception of, and access to, the nuts *m* of the bolts M whereby the security-band L is drawn toward the intermediate rim E; the complete closure of the space O preventing the nuts *m* from becoming clogged with dirt.

It will be observed that, on loosening the bolts T, the outer rim G with the tread-band F may be readily removed and replaced without the necessity of disturbing the attachment existing between the intermediate rim E and the elastic annular cheeks D.

Having now particularly described and ascertained the nature of the said invention and in what manner the same is to be performed, we declare that what we claim is—

The herein described improved pneumatic tire-construction for vehicle wheels, consisting in the combination of an inner rim permanently concentric with the axle, an intermediate or floating rim of greater diameter than said inner rim and displaceable relatively thereto, and an outer rim of greater diameter than said intermediate rim and permanently concentric therewith, the inner and outer rims having each a pair of recurved lateral flanges directed outward from the center of the wheel while the intermediate rim has a similar pair of flanges directed inward toward said center; a pair of separate elastic annular cheeks having beadings at their inner and outer edges adapted to interlock with the flanges of the inner and intermediate rims respectively so that between said rims and elastic cheeks an annular space is inclosed for the reception of the air-tube; an approximately V-shaped expansible security-band comprising an annular series of segments applied between the outer margins of the respective elastic cheeks and secured by radial bolts to the inner side of the intermediate rim; a tread-band carried by the outer rim and having lateral beadings adapted to interlock with the flanges of said rim; a pair of lateral annular clamping-plates for maintaining concentricity between the outer and intermediate rims by the exertion of a wedging action between said rims at each side and throughout the circumference of both; and bolts passing transversely through said clamping-plates and the intervening annular space and serving to draw the one clamping-plate toward the other; substantially as illustrated in the accompanying drawings.

Dated this 18 day of June 1912.

EUGENE RICHARD RIEDINGER.

Witnesses:
GEORGE E. MINTERN,
BERTRAM BEW.